(12) United States Patent
Wakayama et al.

(10) Patent No.: US 8,635,239 B2
(45) Date of Patent: Jan. 21, 2014

(54) INFORMATION PRESENTING APPARATUS, INFORMATION PRESENTING METHOD AND COMPUTER-READABLE RECORDING MEDIUM

(75) Inventors: Shirou Wakayama, Kawasaki (JP); Sumihiko Yamamoto, Tokyo (JP); Satoshi Ozaki, Tokyo (JP); Hirokazu Nagata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/365,695

(22) Filed: Feb. 3, 2012

(65) Prior Publication Data

US 2013/0007048 A1 Jan. 3, 2013

(30) Foreign Application Priority Data

Jun. 29, 2011 (JP) ................................. 2011-144591

(51) Int. Cl.
*G06F 7/00* (2006.01)

(52) U.S. Cl.
USPC .......................................... 707/765; 707/770

(58) Field of Classification Search
USPC .................. 707/765, 766, 767, 768, 769, 770
See application file for complete search history.

(56) References Cited

U.S. PATENT DOCUMENTS

| | | | | |
|---|---|---|---|---|
| 8,069,182 | B2 * | 11/2011 | Pieper ............................ | 707/769 |
| 2003/0167262 | A1 | 9/2003 | Iida et al. | |
| 2007/0266024 | A1 * | 11/2007 | Cao .................................. | 707/6 |
| 2010/0174743 | A1 | 7/2010 | Komano et al. | |
| 2011/0258049 | A1 * | 10/2011 | Ramer et al. ................ | 705/14.66 |
| 2012/0158531 | A1 * | 6/2012 | Dion et al. .................... | 705/26.1 |

FOREIGN PATENT DOCUMENTS

| | | |
|---|---|---|
| JP | H10-069496 A | 3/1998 |
| JP | 2002-189742 A | 7/2002 |
| JP | 2003-233618 A | 8/2003 |
| JP | 2007-122513 A | 5/2007 |
| JP | 2010-073212 A | 4/2010 |
| JP | 2010-160688 A | 7/2010 |
| JP | 2010-219849 A | 9/2010 |

OTHER PUBLICATIONS

Notification of Reason for Rejection mailed on Apr. 10, 2012, in corresponding Japanese Patent Application No. 2011-144591, in seven (7) pages.

* cited by examiner

*Primary Examiner* — James Trujillo
*Assistant Examiner* — Linh Black
(74) *Attorney, Agent, or Firm* — Knobbe, Martens, Olson & Bear, LLP (57) ABSTRACT

A keyword acquiring unit transmits a keyword acquisition request to a first server serving as a keyword providing service, and receives a keyword from the first server. An information acquiring unit transmits an acquisition request of information related to the keyword to a second server serving as an information providing service, and receives the information from the second server. A cover unit presents information acquired by the information acquiring unit to a user. An input unit receives selection of at least one of information presented by the cover unit. A service acquiring unit transmits a search request based on the keyword related to information selected at the input unit to a third server serving as a search service, and acquires a search result from the third server. A socket unit presents the search result to the user.

17 Claims, 6 Drawing Sheets

EXAMPLE OF DATA HELD BY SERVICE LIST HOLDER

| TITLE OF SITE | URI | PARAMETER | LIST OF FUNCTIONS USABLE AT THIS SITE |
|---|---|---|---|
| Google IMAGE SEARCH | http://ajax.googleapis.com/ajax/services/search/images | v, rsz, safe, imgc, key | INFORMATION ACQUIRING, Web SERVICE ACQUIRING |
| Google TREND SEARCH | http://www.google.com/trends/hottrends/atom/hourly | None | KEYWORD ACQUIRING |
| eBay | http://svcs.ebay.com | keywords | Web SERVICE ACQUIRING |
| Twitter SEARCH | http://search.twitter.com/search.json | q | Web SERVICE ACQUIRING |
| Twitter TREND | http://api.twitter.com/1/trends/current.json | None | KEYWORD ACQUIRING |
| Dailymotion | http://api.dailymotion.com/videos | id | INFORMATION ACQUIRING, Web SERVICE ACQUIRING |

EXAMPLE OF DATA HELD BY SERVICE LIST HOLDER

| TITLE OF SITE | URI | PARAMETER | LIST OF FUNCTIONS USABLE AT THIS SITE |
|---|---|---|---|
| Google IMAGE SEARCH | http://ajax.googleapis.com/ajax/services/search/images | v, rsz, safe, imgc, key | INFORMATION ACQUIRING, Web SERVICE ACQUIRING |
| Google TREND SEARCH | http://www.google.com/trends/hottrends/atom/hourly | None | KEYWORD ACQUIRING |
| eBay | http://svcs.ebay.com | keywords | Web SERVICE ACQUIRING |
| Twitter SEARCH | http://search.twitter.com/search.json | q | Web SERVICE ACQUIRING |
| Twitter TREND | http://api.twitter.com/1/trends/current.json | None | KEYWORD ACQUIRING |
| Dailymotion | http://api.dailymotion.com/videos | id | INFORMATION ACQUIRING, Web SERVICE ACQUIRING |

INFORMATION PRESENTING APPARATUS, INFORMATION PRESENTING METHOD AND COMPUTER-READABLE RECORDING MEDIUM

CROSS REFERENCE TO RELATED APPLICATIONS

This application is based upon and claims the benefit of priority from the prior Japanese Patent Application No. 2011-144591, filed on Jun. 29, 2011, the entire contents of which are incorporated herein by reference.

FIELD

Embodiments of the present invention relate to an information presenting apparatus, an information presenting method and a computer-readable recording medium.

BACKGROUND

In a conventional search system, a cross searching CGI receives a search request message from a browser, and generates a search criterion on the basis of the search request message according to a description rule of a search site. The search request message with the search criterion as an argument is transmitted to the search site. HTML data as a result of the cross search is received from the search site. The cross searching CGI program converts the HTML data, and returns search result presentation screen data containing the converted HTML data to the browser.

The system requires a user to preliminarily think about a search keyword and input the keyword into the browser for performing cross searching. The system cannot present information to the user unless the user inputs the keyword.

DETAILED DESCRIPTION

According to an embodiment, there is provided an information presenting apparatus. The information presenting apparatus includes a keyword acquiring unit, an information acquiring unit, a cover unit, an input unit, a service acquiring unit and a socket unit The keyword acquiring unit transmits a keyword acquisition request to a first server serving as a keyword providing service, and receives a keyword from the first server.

The information acquiring unit transmits an acquisition request of information related to the keyword to a second server serving as an information providing service, and receives the information from the second server.

The cover unit presents information acquired by the information acquiring unit to a user.

The input unit receives selection of at least one of information presented by the cover unit.

The service acquiring unit transmits a search request based on the keyword related to information selected at the input unit to a third server serving as a search service, and acquires a search result from the third server.

The socket unit presents the search result to the user.

Hereinafter, the embodiments of the present invention will be explained with reference to the drawings.

Briefly, the embodiments of the present invention simply performs processes of arousing an interesting target to a user from a state where the user is not interested and further acquiring more detailed information as a sequential flow without delay.

Figure 1:
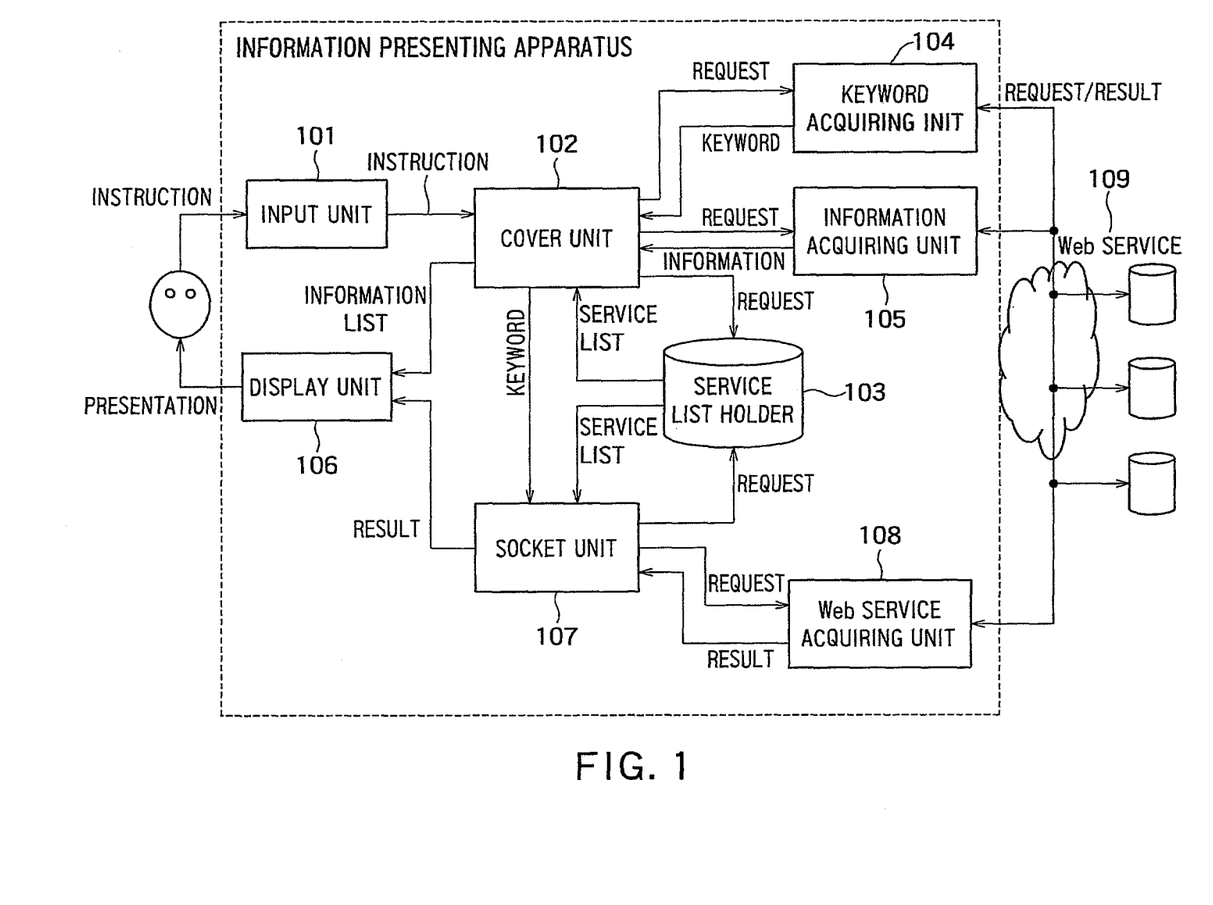
FIG. 1 shows a configuration of an information presenting apparatus according to an embodiment.

FIG. 1 shows a configuration of an information presenting apparatus according to an embodiment.

This apparatus is principally characterized by including two functions of a cover unit 102 and a socket unit 107. The cover unit 102 presents keywords that may interest a user and information related thereto (image, audio or the like), thereby arousing an interest of the user. In a case where the presentation by the cover unit 102 has aroused the interest of the user, the socket unit 107 acquires more detailed information by means of cross search and presents the detailed information to the user. The cover unit 102 and the socket unit 107 can easily be switched to each other, thereby allowing the user to perform an operation from arousing of an interest to acquiring of a search result as a sequential flow without delay. This apparatus will hereinafter be described in detail.

This apparatus can be incorporated in a user terminal, such as a mobile terminal and a personal computer. This apparatus can also be incorporated in a server apparatus that communicates with a plurality of terminals via a network. It is hereinafter provided that this apparatus is incorporated into a user terminal; the description will be made according thereto unless otherwise specified.

The input unit 101 receives an instruction input by a user via a keyboard, a mouse, a touch panel or the like. The instruction input by the user is transmitted from the input unit 101 to the cover unit 102. In a case of execution where this apparatus functions as a server, the input unit 101 receives data of instruction inputs by users via the network from respective user terminals.

The display unit 106 presents an image, an audio or the like to a user. The display unit 106 displays data passed from the cover unit 102 and the socket unit 107 as an image or a moving image or reproduces the data as an audio. The audio may be reproduced on touching. In the case of execution where this apparatus functions as a server, the display unit 106 has a function of transmitting the data to each user terminal.

A service list holder 103 holds information on various web services.

Figure 4:
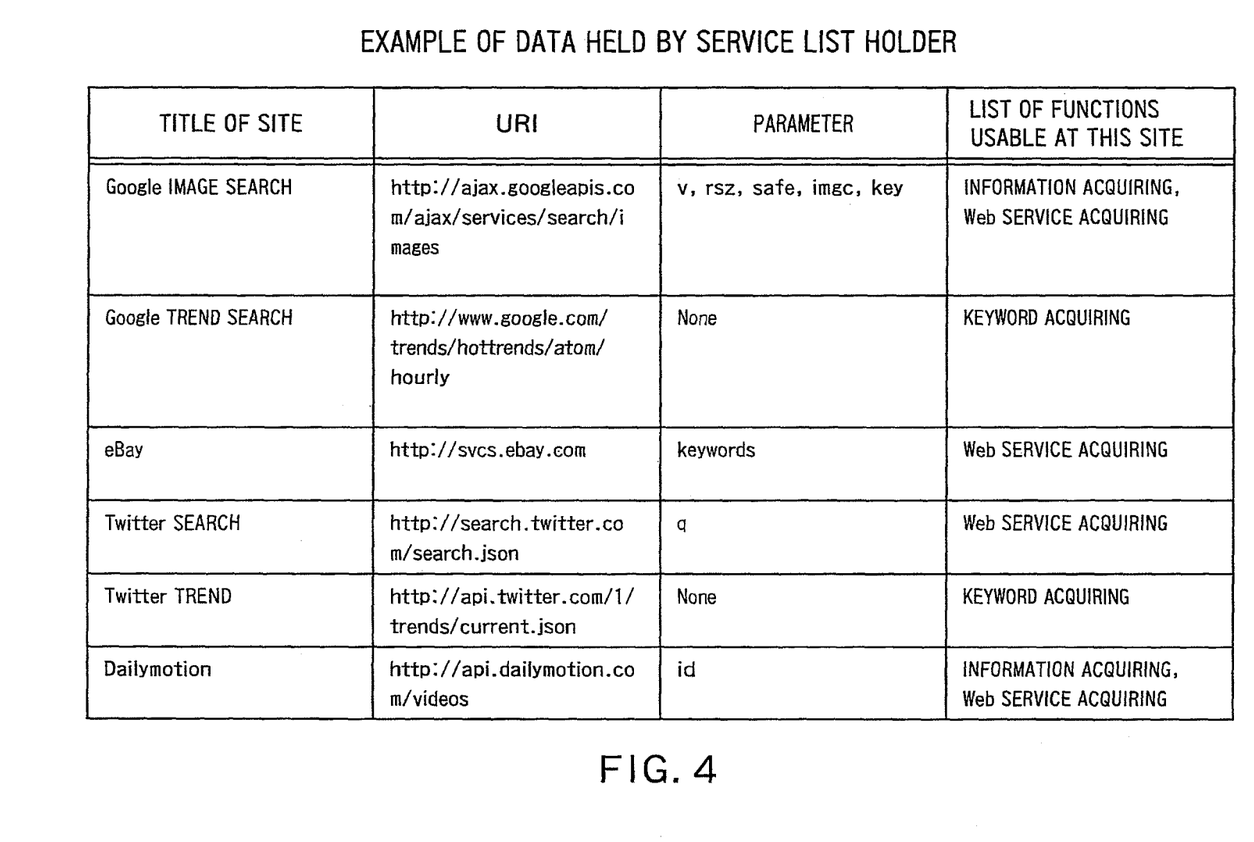
FIG. 4 shows an example of information held by a service list holder.

FIG. 4 shows an example of information held by the service list holder 103.

The service list holder 103 holds a name (title) of a web service, an API (URI) to be used, a parameter necessary to use the web service, and a function that the web service can provide, as a set. This set is held for each web service.

The cover unit 102 and the socket unit 107 passes a request to the service list holder 103, thereby acquiring a list of required web services. The request passed to the service list holder 103 includes desired types of information (e.g. "keyword", "image", "video", "audio", etc.). Further, user taste information and position information may additionally be included. The user taste information and the position information may preliminarily be registered on a terminal or a server.

The service list holder 103 selects an appropriate web service from the held web service list on the basis of the request passed from the cover unit 102 or the socket unit 107, and returns the service to the requester.

For instance, if a "keyword" is designated as a desired type of information, the service list holder 103 returns a list of web services (names of web services, URLs, parameters or the like) that provide current search trend. In the example in FIG. 4, a list of "Google trend search" or "Twitter trend" is returned to the cover unit 102. Note that "Google trend search" and "Twitter trend" are web services that return a list of keywords on a current trend.

As another example, in a case where an "image" is requested as a desired type of information by the cover unit 102, a list of web services of image searches is returned. In the example of FIG. 4, a list of "Google image search" is returned. Note that "Google image search" is a web service that returns an image related to the designated parameter. In another case where "music" is requested, a list of web services that search a library of Creative Commons for the music is returned.

The web service included in the list returned from the service list holder 103 may be singular or plural. The list may be void. In the case where the list is void, this apparatus may display this for the user or simply ignore this. In the case of ignoring, it looks for the user as if the keyword or information does not exist. However, it is preferable to ignore this to reduce user's troubles. However, without information to be displayed to the user at all, it is better to display an indication of an error.

Figure 2:
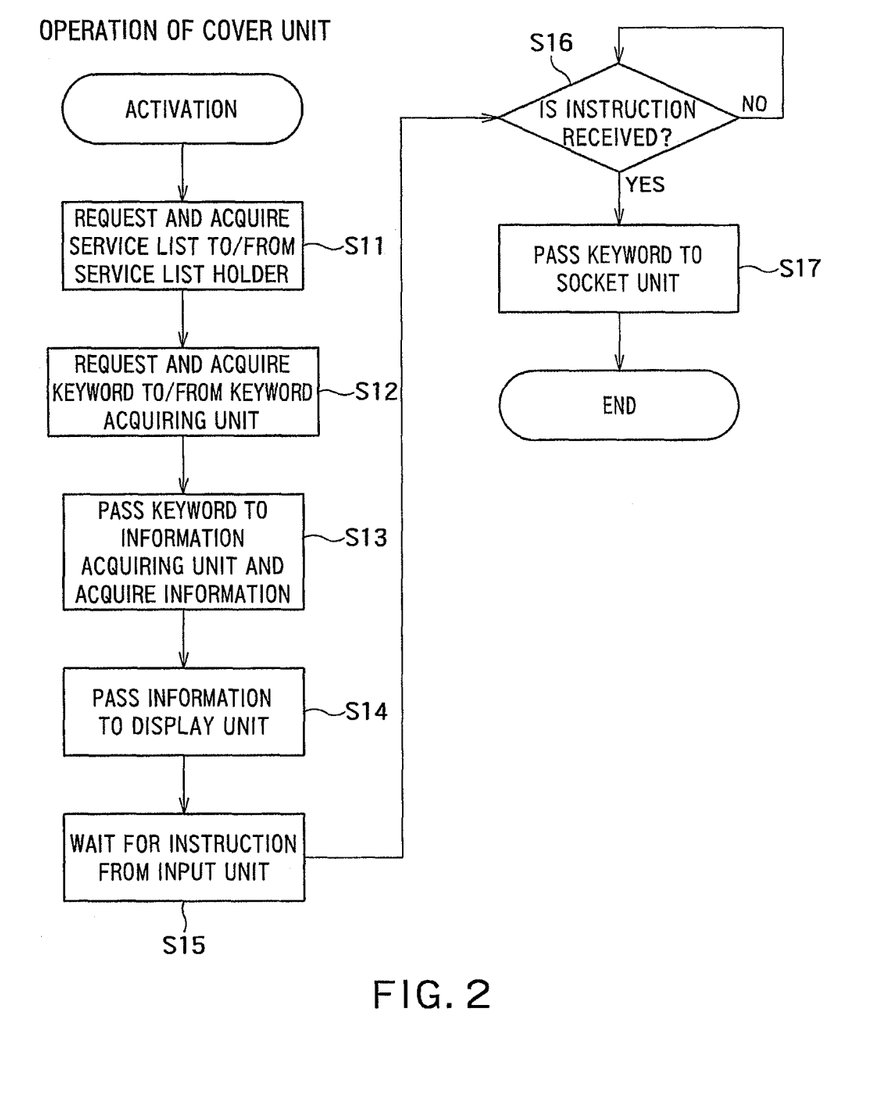
FIG. 2 shows a flow of an operation of a cover unit.

FIG. 2 shows a flow of an operation of the cover unit 102.

When the user activates this apparatus, the cover unit 102 automatically requests a list of web services to be used for acquiring keywords from the service list holder 103, and acquires the list (S11).

The web services concerned are services that do not explicitly require a user input (e.g. aforementioned "Google trend search", "Twitter trend", etc.), such as a service that provides search trend information (keyword) and a service that extracts a keyword from latest articles of specific magazines and blogs and returns the keyword. A server providing this web service corresponds to a first server. The address (URL such as API) of the first server corresponds to a first address.

The cover unit 102 requests a keyword acquiring unit 104 to acquire a keyword from the web service (S12). The request by the cover unit 102 includes the name of a web service and an API to be used to query the web service, and further a parameter therefor as necessary. In this embodiment, the service list holder 103 manages APIs. Instead, the keyword acquiring unit 104 may manage APIs for respective web services. In this case, the cover unit 102 may notify the keyword acquiring unit 104 of only the name of the web service, and the keyword acquiring unit 104 may identify the API concerned.

The keyword acquiring unit 104 queries the web service, creates a keyword list from keywords returned from the web service, and returns the list to the cover unit 102. In a case of using a plurality of web services, keyword lists are created for respective web services having been used. In this case, user taste information and position information may be included in the query, as necessary.

The cover unit 102, having received the keyword list, requests a list of web services again from the service list holder 103. At this time, a web service to be used for acquiring an image is designated. In this example, a list of a web search, "Google image search", is returned to the cover unit 102. Here, the web service to be used for acquiring an image is designated. A web service to be used for acquiring audio data may be designated. A server that provides a service providing information, such as images and audios, corresponds to a second server. The address (URL such as API) of the second server corresponds to a second address.

The cover unit 102 passes the keyword list and the web service list acquired from the service list holder 103 to an information acquiring unit 105 (S13).

The information acquiring unit 105 designates a keyword included in the keyword list and queries the web service included in the web service list. Thus, information corresponding to the keyword (in this example, an image corresponding to the keyword) is acquired. The information acquiring unit 105 associates the acquired information with the keyword, and returns the associated information to the cover unit 102.

The cover unit 102 holds information acquired from the information acquiring unit 105 and the keyword used for acquiring the information as one set. That is, the cover unit 102 includes a storage that stores the set of the information and the keyword. In this case, the storage exists in the cover unit 102. Instead, the storage may exist in an external storage accessible from this apparatus or another place.

The cover unit 102 transmits the pair of the acquired information and the keyword to the display unit 106, thereby presenting the pair of the information and the keyword to the user (S14). The cover unit 102 waits for a user instruction from the input unit 101 (S15).

Figure 5:
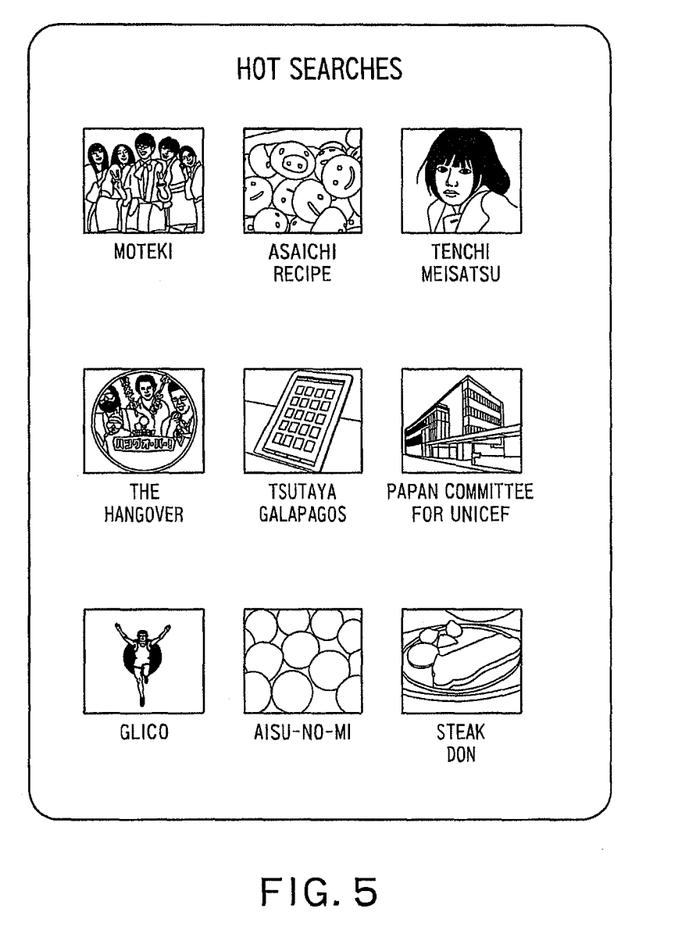
FIG. 5 shows an example of a list of pairs of a keyword and information presented by the cover unit.

The display unit 106 displays a pair of the information (here, the image) and the keyword on the screen. That is, not only the keyword but also the information concerned is displayed together therewith (or the information only). This allows displaying in a form capable of appealing to the user, and enables an interest of the user to be aroused. FIG. 5 shows an example of a list of pairs of information (images) and keywords that is to be displayed on the display unit 106.

The user selects one interesting piece of information (here, an image) using the input unit 101. The identifier of the selected piece of information is notified to the cover unit 102 (Yes in S16). Although the one piece of information is selected here, a plurality of pieces of information may simultaneously be selected. Although the information is selected here, a displayed keyword may be selected instead.

The cover unit 102 passes the keyword corresponding to the information selected by the user to the socket unit 107 (S17).

Figure 3:
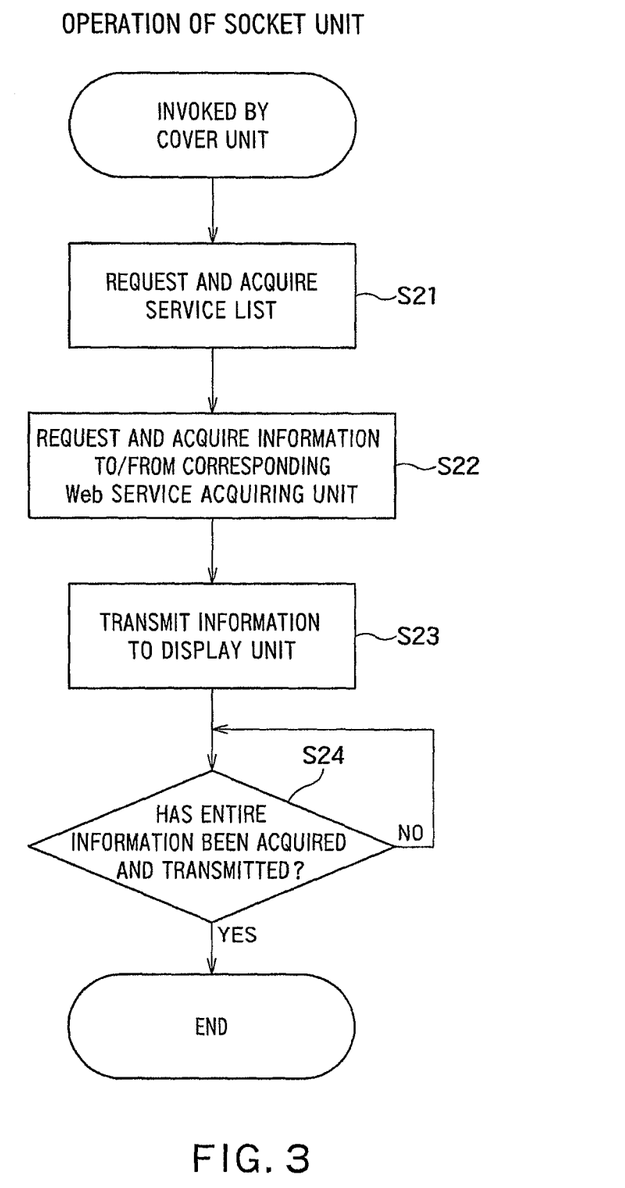
FIG. 3 shows a flow of an operation of a socket unit.

FIG. 3 shows a flow of an operation of the socket unit 107.

First, the socket unit 107 requests a list of web services to be used from the service list holder 103, and acquires the list (S21).

Responsive to the query, the service list holder 103 retrieves and creates the list of web services and returns the list to the socket unit 107. The web service to be retrieved here is a web service for cross searching on the internet. A server providing the search service corresponds to a third server. The address (URL such as API) of the third server corresponds to a third address.

At this time, the request issued to the service list holder 103 may include the keyword passed from the cover unit 102. In the case where the keyword is included, the service list holder 103 may search for a web service suitable for the keyword.

The socket unit 107 passes the list of web servers acquired from the service list holder 103 and the keyword passed from the cover unit 102 to the web service acquiring unit 108 (S22).

The web service acquiring unit 108 requests a cross search according to the keyword for the respective web services on the passed list, and acquires results of the cross search from the respective web services. The acquired results of the cross search at the respective web services are returned to the socket unit 107.

The socket unit 107 integrates the results of the cross search at the respective web services, which have been passed from the web service acquiring unit 108, and transmits the integrated results to the display unit 106 (S23, Yes in S24). This allows the results of the cross search to be presented to the user.

At this time, instead of waiting for acquisition of all the results from the web service acquiring unit 108, the socket unit 107 may successively pass each result to the display unit 106 upon receipt of the result. This reduces sensible waiting time of the user.

Figure 6:
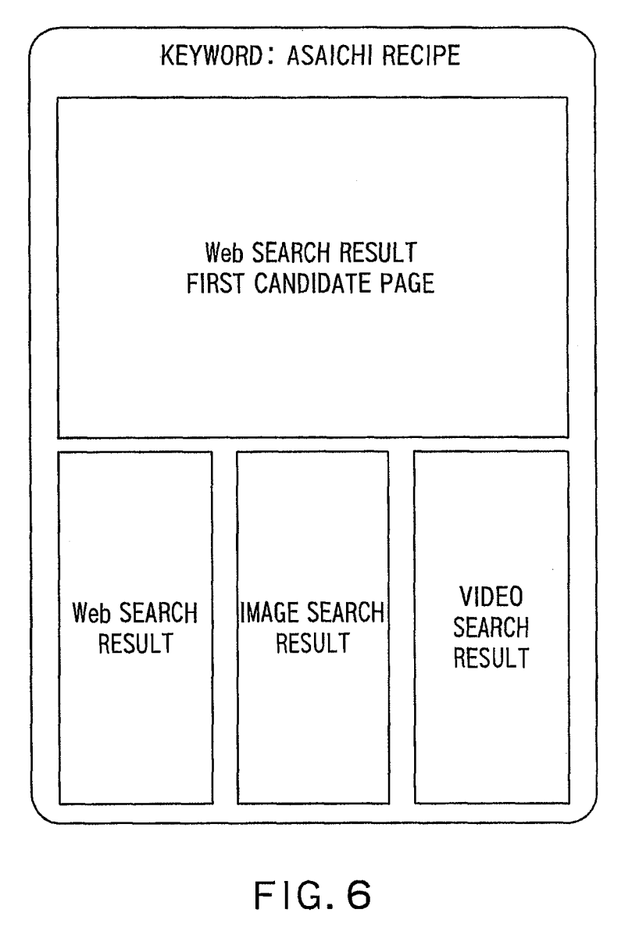
FIG. 6 shows a result, presented by the socket unit, of a cross search through each web service.

The display unit 106 displays information transmitted from the socket unit 107 in an integrated view. FIG. 6 shows an example of results of a cross search from the respective web services displayed on the display unit 106. According to the example shown in FIG. 6, results of the cross search conducted at three web services, which are a web search, an image search and a video search, are displayed around the bottom of the screen. "WEB SEARCH RESULT, FIRST CANDIDATE PAGE" on the screen is a detailed web page of what is displayed at the top among "WEB SEARCH RESULTS".

As described above, this embodiment can simply perform processes from arousing of the interesting target to further acquiring more detailed information as the one sequential flow without delay, from the state where the user is not interested.

That is, the one sequential flow of processes from arousing an interest by the cover unit 102 to acquiring detailed information by the socket unit 107 can simply be performed without delay. More specifically, the processing by the cover unit autonomously acquires the search keyword (search criterion), thereby negating the need of initial input by the user. Further, the information (an image, audio or the like) corresponding to the keyword is acquired and presented to the user; the cross search is conducted on the information that interests the user; the search result is returned. As described above, the sequential flow from the state without a search criterion at all, then presenting the search criterion and presenting a wide variety of information using a cross search can easily be realized.

The information presenting apparatus of this embodiment may also be realized using a general-purpose computer device as basic hardware. That is, each constitution element can be realized by causing a processor mounted in the above described computer device to execute a program. In this case, the apparatus may be realized by installing the above described program in the computer device beforehand or may be realized by storing the program in a storage medium such as a CD-ROM or distributing the above described program over a network and installing this program in the computer device as appropriate. Furthermore, the service list holder in the apparatus may also be realized using a memory device or hard disk incorporated in or externally added to the above described computer device or a storage medium such as CD-R, CD-RW, DVD-RAM, DVD-R as appropriate.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. An information presenting apparatus including a processor, comprising:
   a keyword acquiring unit configured to transmit a keyword acquisition request to a first server serving as a keyword providing service, and to receive a keyword from the first server;
   an information acquiring unit configured to transmit an acquisition request of information related to the keyword to a second server serving as an information providing service without a user's order specifying the keyword, and to receive the information from the second server;
   a cover unit configured to present information acquired by the information acquiring unit to a user;
   an input unit configured to receive selection of at least one of information presented by the cover unit;
   a service acquiring unit configured to transmit a search request based on the keyword related to information selected at the input unit to a third server serving as a search service, and to acquire a search result from the third server; and
   a socket unit configured to present the search result to the user, wherein
   the cover unit is configured to request the keyword acquiring unit to acquire the keyword from the first server,
   the keyword acquiring unit is configured to transmit the keyword acquisition request according to a request from the cover unit and pass a keyword acquired from the first server to the cover unit,
   the cover unit is configured to request the information acquiring unit to acquire information related to the keyword,
   the information acquiring unit is configured to transmit the acquisition request of the information by designating the keyword according to a request from the cover unit and acquire the information related to the keyword from the second server,
   the information presenting apparatus further corn rises a service list holder configured to store a first address that is an address of the first server, a second address that is an address of the second server and a third address that is an address of the third server,
   the cover unit is configured to acquire the first address from the service list holder, and notify the first address to the keyword acquiring unit,
   the keyword acquiring unit is configured to transmit the keyword acquisition request addressed to the first address,
   the cover unit is configured to acquire the second address from the service list holder, and notify the second address to the information acquiring unit,
   the information acquiring unit is configured to transmit the acquisition request of the information, addressed to the second address,
   the socket unit is configured to acquire the third address from the service list holder, and notifies the third address to the service acquiring unit, and
   the service acquiring unit is configured to transmit the search request addressed to the third address.

2. The apparatus according to claim 1,
wherein the cover unit searches the service list holder to obtain the second address corresponding to the keyword acquired by the keyword acquiring unit.

3. The apparatus according to claim 1,
wherein the socket unit searches the service list holder to obtain the third address corresponding to the keyword.

4. The apparatus according to claim 1,
wherein the acquisition request of the information is an acquisition request of image data or audio data.

5. The apparatus according to claim 1, further comprising a display unit,
wherein the cover unit provides the information to the display unit,
the socket unit provides the search result to the display unit, and
the display unit displays the information and displays the search result.

6. The apparatus according to claim 1,
wherein the cover unit transmits the information to a terminal of the user via a network,
the socket unit transmits the search result to the terminal via the network, and
the input unit receives the selection of the information from the terminal via the network.

7. The apparatus according to claim 1,
wherein the keyword acquisition request includes at least one of user taste information and position information.

8. An information presenting method, comprising:
transmitting a keyword acquisition request to a first server serving as a keyword providing service, and receiving a keyword from the first server;
transmitting, in response to reception of the keyword from the first server, an acquisition request of information related to the keyword by designating the keyword to a second server serving as an information providing service without a user's order specifying the keyword, and receiving the information from the second server;
presenting the acquired information to a user;
receiving selection of at least one of information which have been presented to the user;
transmitting a search request based on the keyword related to the selected information to a third server serving as a search service, and acquiring a search result from the third server; and
presenting the search result to the user,
the information presenting method further comprises:
acquiring the first address that is an address of the first server from a service list holder, and transmitting the keyword acquisition request addressed to the first address,
acquiring, in response to reception of the keyword from the first server, a second address that is an address of the second server, from the service list holder, and transmitting the acquisition request of the information, addressed to the second address, and
acquiring a third address that is an address of the third server, from the service list holder, and transmitting the search request addressed to the third address.

9. The method according to claim 8, further comprising
searching the service list holder to obtain the second address corresponding to the acquired keyword.

10. The method according to claim 8, further comprising
searching the service list holder to obtain the third address corresponding to the keyword.

11. The method according to claim 8,
wherein the acquisition request of the information is an acquisition request of image data or audio data.

12. The method according to claim 8,
wherein the keyword acquisition request includes at least one of user taste information and position information.

13. A non-transitory computer readable medium storing a computer program which, when executed by a computer, causes the computer to perform steps comprising:
transmitting a keyword acquisition request to a first server serving as a keyword providing service, and receiving a keyword from the first server;
transmitting, in response to reception of the keyword from the first server, an acquisition request of information related to the keyword by designating the keyword to a second server serving as an information providing service without a user's order specifying the keyword, and receiving the information from the second server;
presenting the acquired information to a user;
receiving selection of at least one information from among information which have been presented;
transmitting a search request based on the keyword related to the selected information to a third server serving as a search service, and acquiring a search result from the third server; and
presenting the search result to the user, wherein
the steps includes acquiring a first address that is an address of the first server from a service list holder, and transmitting the keyword acquisition request addressed to the first address,
acquiring a second address that is an address of the second server from the service list holder, and transmitting the acquisition request of the information, addressed to the second address,
acquiring a third address that is an address of the third server from the service list holder, and transmitting the search request addressed to the third address.

14. The medium according to claim 13,
wherein the steps includes searching the service list holder to obtain the second address corresponding to the acquired keyword.

15. The medium according to claim 13,
wherein the steps includes searching the service list holder to obtain the third address corresponding to the keyword.

16. The medium according to claim 13,
wherein the acquisition request of the information is an acquisition request of image data or audio data.

17. The medium according to claim 13,
wherein the keyword acquisition request includes at least one of user taste information and position information.

* * * * *

UNITED STATES PATENT AND TRADEMARK OFFICE
CERTIFICATE OF CORRECTION

| | | |
|---|---|---|
| PATENT NO. | : 8,635,239 B2 | Page 1 of 1 |
| APPLICATION NO. | : 13/365695 | |
| DATED | : January 21, 2014 | |
| INVENTOR(S) | : Wakayama et al. | |

It is certified that error appears in the above-identified patent and that said Letters Patent is hereby corrected as shown below:

In the Drawings

Sheet 1 of 6 (FIG. 1, Box No. 104) at line 2, Change "INIT" to --UNIT--.

In the Specification

In column 1 at line 56, Change "socket unit" to --socket unit.--.

In the Claims

In column 6 at line 39, In Claim 1, change "corn rises" to --comprises--.

In column 7 at line 2, In Claim 4, after "of the" insert --one or more pieces of--.

In column 7 at line 6, In Claim 5, change "provides the" to --is configured to provide the one or more pieces of--.

In column 7 at line 8, In Claim 5, change "provides" to --is configured to provide--.

In column 7 at line 10, In Claim 5, change "displays the" to --is configured to display the one or more pieces of--.

In column 7 at line 10, In Claim 5, change "displays" to --display--.

In column 7 at line 13, In Claim 6, change "transmits" to --is configured to transmit--.

In column 7 at line 15, In Claim 6, change "transmits" to --is configured to transmit--.

In column 7 at line 17, In Claim 6, change "receives" to --is configured to receive--.

In column 8 at line 5, In Claim 11, after "of the" insert --one or more pieces of--.

In column 8 at line 50, In Claim 16, after "of the" insert --one or more pieces of--.

Signed and Sealed this
Fourteenth Day of October, 2014

Michelle K. Lee
*Deputy Director of the United States Patent and Trademark Office*